United States Patent
Suzuki et al.

(10) Patent No.: US 9,169,883 B2
(45) Date of Patent: Oct. 27, 2015

(54) CALIPER BRAKE DEVICE FOR VEHICLE

(75) Inventors: Tsutomu Suzuki, Kawasaki (JP);
Hiroaki Wakabayashi, Sagamihara (JP);
Yoshiyuki Ookawara, Sagamihara (JP);
Masanobu Nankyo, Tokyo (JP);
Fumiko Nankyo, legal representative, Musashimurayama (JP); Yasushi Karino, Tokyo (JP)

(73) Assignees: KAYABA INDUSTRY CO., LTD., Tokyo (JP); RAILWAY TECHNICAL RESEARCH INSTITUTE, Tokyo (JP)

( * ) Notice: Subject to any disclaimer, the term of this patent is extended or adjusted under 35 U.S.C. 154(b) by 1583 days.

(21) Appl. No.: 12/450,289

(22) PCT Filed: Oct. 10, 2008
(Under 37 CFR 1.47)

(86) PCT No.: PCT/JP2008/068910
§ 371 (c)(1),
(2), (4) Date: Sep. 18, 2009

(87) PCT Pub. No.: WO2009/048171
PCT Pub. Date: Apr. 16, 2009

(65) Prior Publication Data
US 2010/0044167 A1    Feb. 25, 2010

(30) Foreign Application Priority Data
Oct. 11, 2007   (JP) .................................. 2007-265597

(51) Int. Cl.
*F16D 55/22*   (2006.01)
*F16D 55/224*  (2006.01)
(Continued)

(52) U.S. Cl.
CPC .............. *F16D 55/2245* (2013.01); *B61H 5/00* (2013.01); *F16D 55/34* (2013.01); *F16D 65/095* (2013.01);
(Continued)

(58) Field of Classification Search
CPC ....... B61H 5/00; F16D 55/2245; F16D 55/34; F16D 65/095
USPC ............. 188/3 R, 3 H, 18 A, 34, 43, 45, 71.1, 188/72.3, 72.4, 72.5, 73.1, 76
See application file for complete search history.

(56) References Cited

U.S. PATENT DOCUMENTS

| 2,487,117 | A  | 11/1949 | Eaton |
| 3,830,345 | A  | 8/1974  | Boyles |
| 6,230,851 | B1 | 5/2001  | Yoshizawa et al. |

FOREIGN PATENT DOCUMENTS

| JP | U64531/1980 | 5/1980 |
| JP | 58005541 A  | 1/1983 |

(Continued)

*Primary Examiner* — Xuan Lan Nguyen
(74) *Attorney, Agent, or Firm* — Rabin & Berdo, P.C.

(57) ABSTRACT

A brake caliper (10) includes a first caliper arm (12) that opposes a first frictional surface (6a) of a vehicle wheel (5) and a second caliper arm (14) that opposes a second frictional surface (6b) of the same. A movable brake pad (7) is supported by the first caliper arm (12) and applies a braking force to the first frictional surface (6a). A plurality of pistons (55) which drive the movable brake pad (7) in accordance with expansion of a diaphragm (75) provided in the brake caliper (10), and a guide member (65) that guides displacement of the plurality of pistons (55) in a right-angle direction relative to the first frictional surface (6a) are provided, and therefore the movable brake pad (7) applies an even braking force to the vehicle wheel (5) in cooperation with a fixed brake pad (700) fixed to the second caliper arm (14).

13 Claims, 10 Drawing Sheets

(51) Int. Cl.
  *B61H 5/00*   (2006.01)
  *F16D 55/34*  (2006.01)
  *F16D 65/095* (2006.01)
  *F16D 65/18*  (2006.01)
  *F16D 121/02* (2012.01)
  *F16D 125/04* (2012.01)
  *F16D 125/12* (2012.01)
  *F16D 125/14* (2012.01)

(52) U.S. Cl.
  CPC ............ *F16D 65/18* (2013.01); *F16D 2121/02* (2013.01); *F16D 2125/04* (2013.01); *F16D 2125/12* (2013.01); *F16D 2125/14* (2013.01)

(56) References Cited

FOREIGN PATENT DOCUMENTS

| | | |
|---|---|---|
| JP | 63160446    | 10/1988 |
| JP | 06-288417 A | 10/1994 |
| JP | U87741/1994 | 12/1994 |
| JP | 08-226469 A | 9/1996  |
| JP | 8-226471    | 9/1996  |
| JP | 10-267058 A | 10/1998 |
| JP | 11-193835 A | 7/1999  |
| JP | 11-230202   | 8/1999  |
| JP | 11-230212   | 8/1999  |
| JP | 2005-221017 | 8/2005  |
| JP | 2007-231984 | 9/2007  |
| WO | WO-98/29671 A1 | 7/1998 |
| WO | WO-02/08628 A2 | 1/2002 |

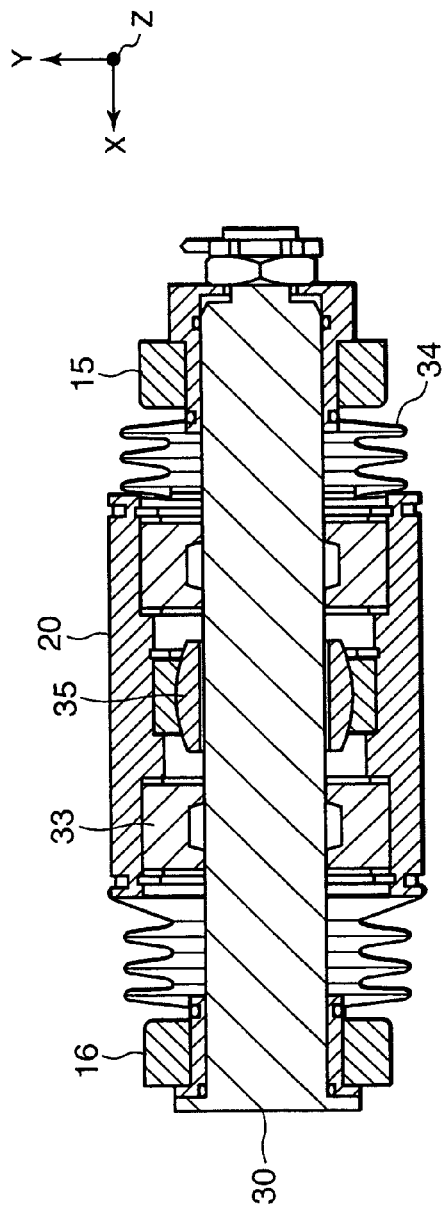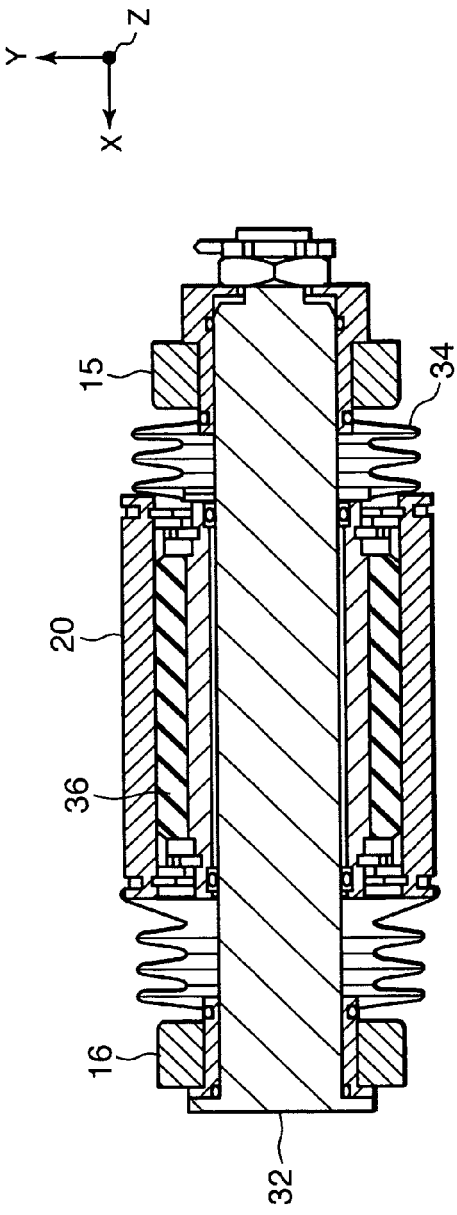
FIG. 4A
FIG. 4B

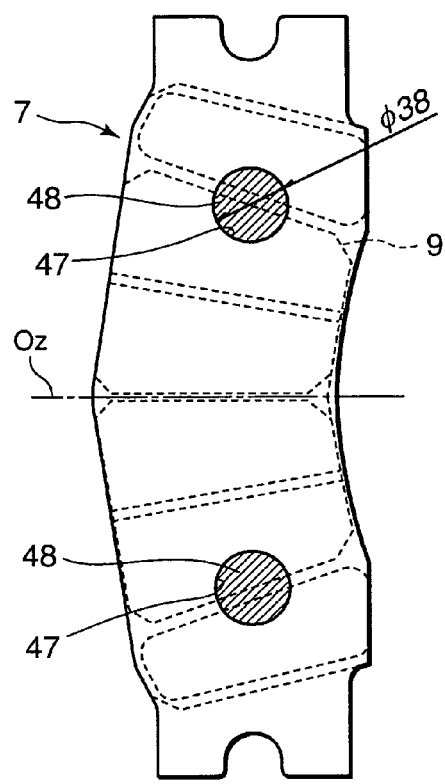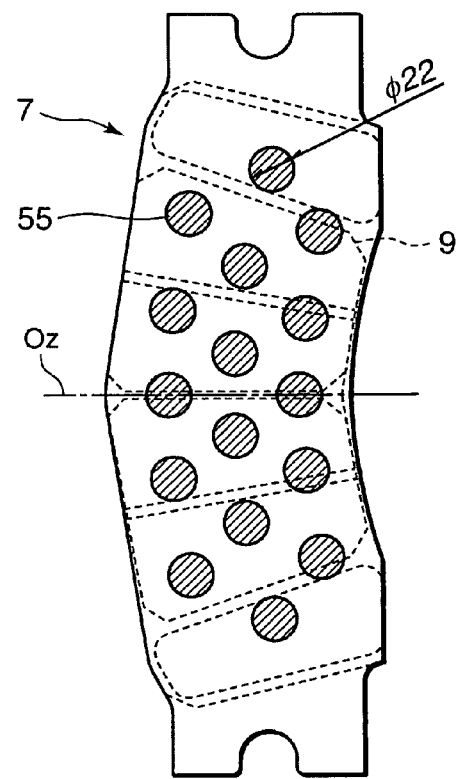
PRIOR ART
FIG. 5A
FIG. 5B

CALIPER BRAKE DEVICE FOR VEHICLE

CROSS-REFERENCE TO RELATED APPLICATION

This application is based on, and claims priority to, Japanese Patent Application No. 2007-265597, filed on Oct. 11, 2007, the contents of which are incorporated herein by reference.

FIELD OF THE INVENTION

This invention relates to a caliper brake device for a vehicle, which applies a brake to a rotary body by sandwiching two frictional surfaces formed on either side face of the rotary body.

BACKGROUND OF THE INVENTION

A railway vehicle is typically installed with a pneumatic-hydraulic converter that converts air pressure supplied from an air pressure source into oil pressure such that a hydraulic brake is activated by the oil pressure, which is supplied thereto from the pneumatic-hydraulic converter via a hydraulic pipe.

In relation to this point, JPH08-226469 and JPH08-226471, published by the Japan Patent Office in 1996, disclose a hydraulic brake device for a railway vehicle in which a hydraulic cylinder presses a brake pad against a frictional surface of a rotary body such as a brake rotor in accordance with a supplied oil pressure.

Meanwhile, by installing a pneumatic brake that is activated by air pressure supplied from an air pressure source in the railway vehicle, it may be possible to omit the pneumatic-hydraulic converter and the hydraulic pipe.

In relation to this point, JPH11-193835, published by the Japan Patent Office in 1999, discloses an air brake device for a railway vehicle in which a pneumatic actuator presses a brake pad against a frictional surface of a rotary body when compressed air is supplied to an air chamber of the pneumatic actuator. FIG. 6 of this conventional technique further discloses an air brake device employing a lever.

SUMMARY OF THE INVENTION

In these railway vehicle brake devices, the hydraulic cylinder or the actuator presses a part of the brake pad rather than pressing the entire brake pad. As a result, a brake caliper may be bent by a reaction force corresponding to the pressing force, causing the frictional surface to deform. Further, when a local temperature increase occurs in the brake pad, a frictional coefficient of the brake pad decreases, and as a result, it may be impossible for the brake pad to exhibit its original braking force. Moreover, partial wear is likely to occur on the brake pad.

In the case of an air brake employing a lever, it is difficult to cause the brake pad to press the frictional surface evenly due to the effect of frictional force acting on a bearing portion of the lever, and therefore partial wear is particularly likely to occur on the brake pad.

It is therefore an object of this invention to make a pressing force with which a brake pad presses a rotary body even.

To achieve the object described above, this invention provides a caliper brake device for a vehicle, which applies a brake to rotation of a rotary body by sandwiching a first frictional surface and a second frictional surface formed on either side face of the rotary body, comprising a brake caliper having a first caliper arm that faces the first frictional surface and a second caliper arm that faces the second frictional surface, a movable brake pad that is supported by the first caliper arm and applies a braking force to the first frictional surface by displacing toward the first frictional surface, a pressure chamber formed in the brake caliper, a diaphragm that expands in accordance with a pressure of the pressure chamber, a plurality of pistons that drive the movable brake pad in a rotary axis direction of the rotary body in accordance with the expansion of the diaphragm, and a guide member that guides a displacement of the plurality of pistons in a right-angle direction relative to the first frictional surface.

The details as well as other features and advantages of this invention are set forth in the remainder of the specification and are shown in the accompanying drawings.

BRIEF DESCRIPTION OF THE DRAWINGS

FIGS. 4A and 4B are longitudinal sectional views of a support structure for an upper slide pin and a lower slide pin according to this invention.

FIGS. 5A and 5B are a plan view of a movable brake pad of a conventional hydraulic piston type caliper brake device and a plan view of a movable brake pad of the caliper brake device according to this invention.

DESCRIPTION OF THE PREFERRED EMBODIMENTS

Figure 1:
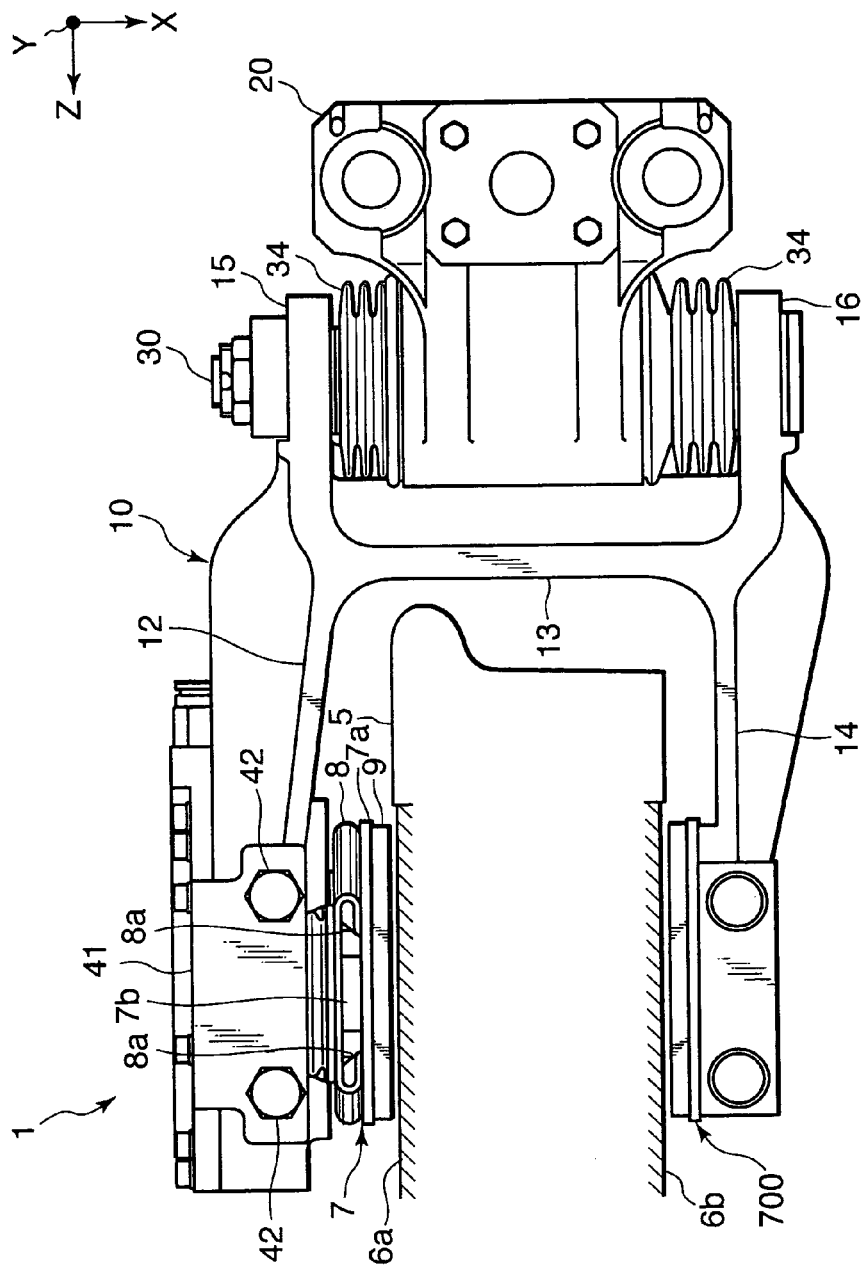
FIG. 1 is a plan view of a caliper brake device according to this invention.

Referring to FIG. 1 of the drawings, a caliper brake device 1 for a railway vehicle applies a brake to the rotation of a vehicle wheel 5 using a movable brake pad 7 and a fixed brake pad 700 that oppose each other. An X axis, a Y axis, and a Z axis in the figure correspond to an axle direction of the vehicle wheel 5, a vertical direction, and a front-rear direction, respectively. A first frictional surface 6a and a second frictional surface 6b are formed in advance on the respective side faces of the vehicle wheel 5 so as to face the movable brake pad 7 and the fixed brake pad 700, respectively.

The movable brake pad 7 is supported on a tip end of a first caliper arm 12. The fixed brake pad 700 is supported on a tip end of a second caliper arm 14. The first caliper arm 12 and second caliper arm 14 form a part of a brake caliper 10 disposed so as to straddle the vehicle wheel 5.

Figure 2:
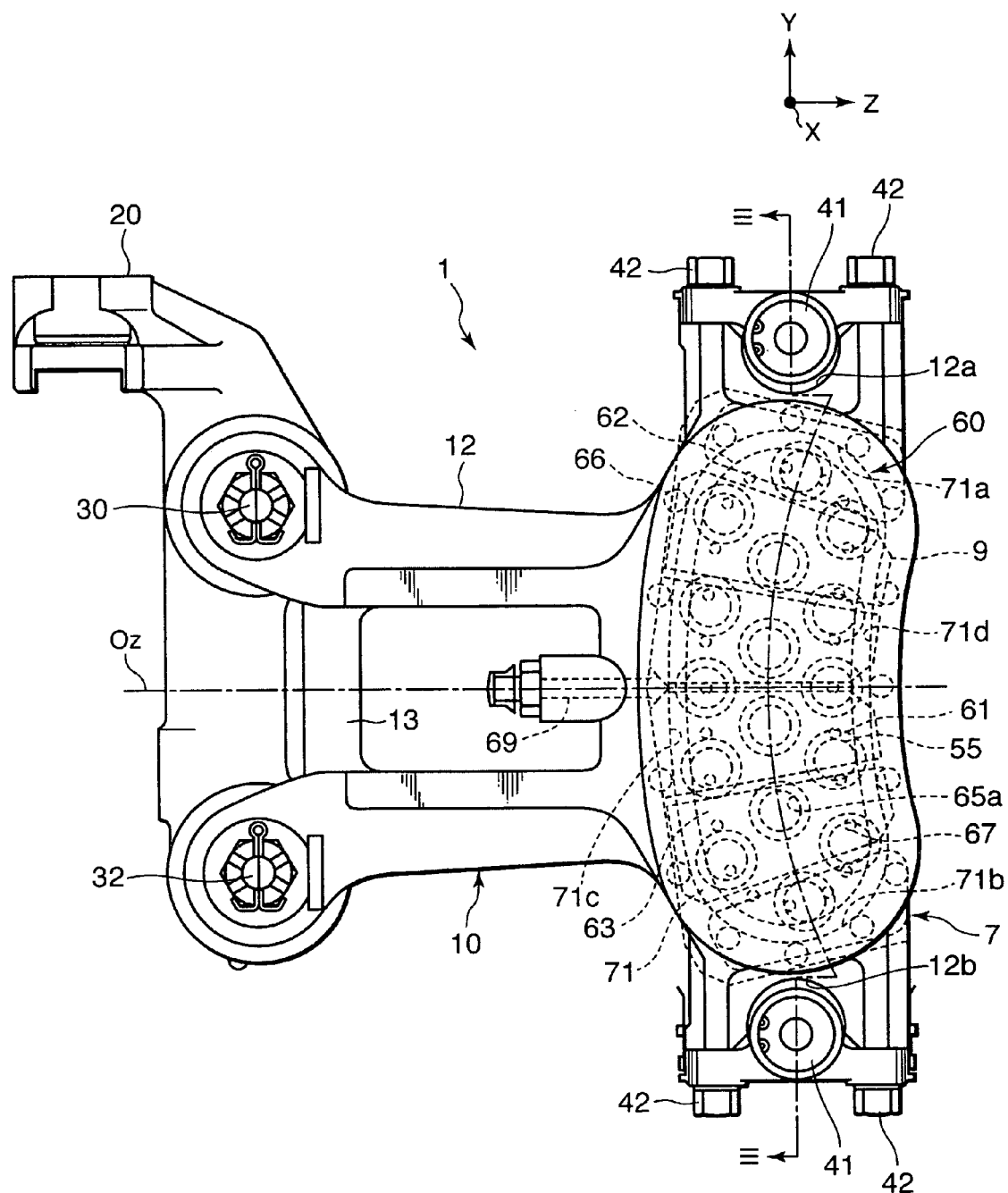
FIG. 2 is a side view of the caliper brake device.

Referring to FIG. 2, the brake caliper 10 is latched to a support frame 20 by an upper slide pin 30 and a lower slide pin 32. The support frame 20 is fixed to a bogie of the railway vehicle or a vehicle body.

Referring to FIGS. 4A and 4B, the upper slide pin 30 and the lower slide pin 32 respectively penetrate two-pronged brackets 15 and 16 formed on the brake caliper 10. The respective ends of the upper slide pin 30 and the lower slide pin 32 are latched to the brackets 15 and 16.

The upper slide pin 30 penetrates the support frame 20 between the brackets 15 and 16 via a pair of rubber bushes 33 and a radial bearing 35 disposed between the pair of rubber bushes 33. The radial bearing 35 allows the upper slide pin 30 to displace in the X axis direction and oscillate about the X axis, and also to oscillate within a fixed range about the Z axis centering on the radial bearing 35. On the other hand, parallel movement of the upper slide pin 30 in the Y axis direction and the Z axis direction of the figure is restricted.

The lower slide pin 32 penetrates the support frame 20 between the brackets 15 and 16 via a rubber bush 36. The rubber bush 36 allows the lower slide pin 32 to displace in the X axis direction and oscillate about the X axis, and to oscillate within a fixed range about the Z axis, similarly to the upper slide pin 30. Furthermore, elastic deformation of the rubber bush 36 allows the lower slide pin 32 to perform a slight parallel movement in the Y axis direction and the Z axis direction of the figure.

A gap between the brackets 15 and 16 is set to be considerably wider than a width of the support frame 20, and the upper slide pin 30 is covered by a rubber boot 34 between the support frame 20 and each of the brackets 15, 16 so as not to be exposed to the outside. Similarly to the upper slide pin 30, the lower slide pin 32 is covered by the rubber boot 34 between the support frame 20 and each of the brackets 15, 16.

By forming the upper slide pin 30 and lower slide pin 32 in the manner described above, the brake caliper 10 can displace in the X axis direction between the bogie or the vehicle body and the vehicle wheel 5, or in other words in the X axis direction following relative displacement in a vehicle transverse direction. Further, the movable brake pad 7 and the fixed brake pad 700 are held parallel to a first frictional surface 6a of the vehicle wheel 5 and a second frictional surface 6b of the vehicle wheel 5, respectively.

Returning to FIG. 1, the brake caliper 10 comprises a yoke 13 that joins the first caliper arm 12 to the second caliper arm 14.

The fixed brake pad 700, which is disposed on an opposite side of the vehicle wheel 5 to the movable brake pad 7, is fixed directly to the second caliper arm 14. The fixed brake pad 700 comprises a lining 9 that is configured to contact the second frictional surface 6b while the vehicle wheel 5 rotates.

A diaphragm actuator 60 that drives the movable brake pad 7 is built into the first caliper arm 12 supporting the movable brake pad 7. The movable brake pad 7 is constituted by a lining 9 that is configured to contact the first frictional surface 6a while the vehicle wheel 5 rotates, a body 7a to which the lining 9 is fixed, and an engaging portion 7b formed on a rear surface of the body 7a. The engaging portion 7b is inserted into a holder 8 to be free to displace in the Y axis direction. The holder 8 comprises guide rails 8a that oppose one another in the Y axis direction, for accommodating and holding the engaging portion 7b.

Figure 3:
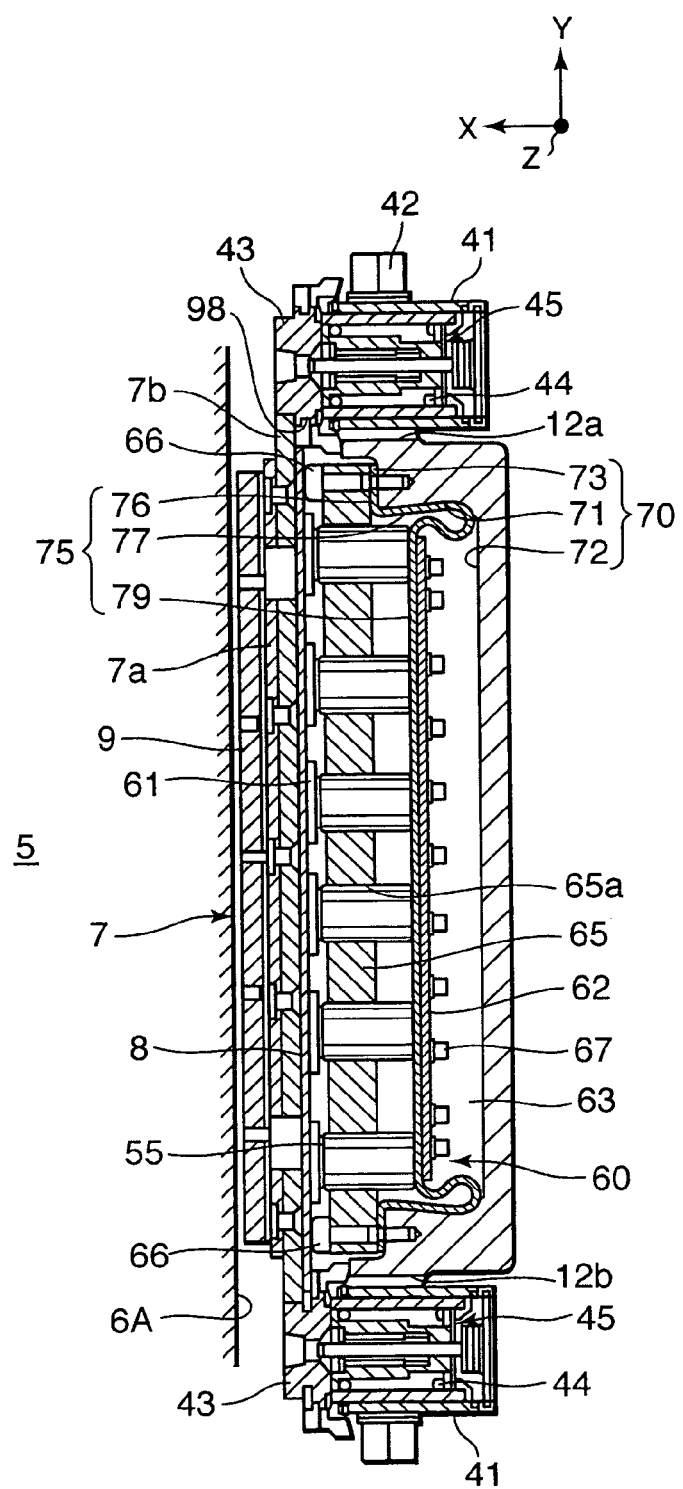
FIG. 3 is a longitudinal sectional view of the caliper brake device taken along a III-III line in FIG. 2.

Referring to FIG. 3, an upper end and a lower end of the holder 8 are respectively fitted into engaging grooves 98 formed in an outer periphery of anchor pins 43 disposed above and below the holder 8. The anchor pins 43 project toward the vehicle wheel 5 from adjustors 41 that are respectively fixed to an upper end and a lower end of the first caliper arm 12 by anchor bolts 42. By fitting the upper end and lower end of the holder 8 into the engaging grooves 98, an upper end and a lower end of the engaging portion 7b of the movable brake pad 7 abut against the tip ends of the anchor pins 43 such that displacement of the movable brake pad 7 in the Y axis direction is restricted.

To attach the movable brake pad 7 to the first caliper arm 12, the engaging portion 7b of the movable brake pad 7 is inserted into an inner side of the guide rails 8a of the holder 8 from below in a state where the adjustor 41 and the anchor pin 43 are detached from the lower end of the first caliper arm 12. When the engaging portion 7b has reached a predetermined position of the holder 8, the adjustor 41 and the anchor pin 43 are fixed to the lower end of the first caliper arm 12 by the anchor bolt 42. Thus, the upper end and lower end of the holder 8 are respectively fitted into the engaging grooves 98 of the anchor pins 43 such that displacement of the movable brake pad 7 in the Y axis direction is restricted.

The adjustor 41 comprises a return spring 44 that biases the movable brake pad 7 in a separating direction from the first frictional surface 6a, and a gap adjustment mechanism 45 that adjusts a gap between the movable brake pad 7 and the first frictional surface 6a to a substantially fixed value when a force other than the spring force of the return spring 44 does not act on the movable brake pad 7. When the brake is released, the movable brake pad 7 is removed from the first frictional surface 6a by the return spring 44 and opposes the first frictional surface 6a at the gap prescribed by the gap adjustment mechanism 45.

The adjustor 41 is a well-known mechanism disclosed in JPH06-288417, published by the Japan Patent Office in 1994. The content thereof is incorporated herein by reference, and therefore a detailed description has been omitted.

By means of the support structure described above, the movable brake pad 7 is supported by the first caliper arm 12 to be capable of displacing in the X axis direction while remaining parallel to the first frictional surface 6a.

Returning to FIG. 2, arc-shaped adjustor attachment recess portions 12a and 12b for attaching the adjustors 41 are formed on the upper end and the lower end of the first caliper arm 12, respectively. The diaphragm actuator 60 is attached to the first caliper arm 12 between the upper and lower adjustors 41 so as to face the movable brake pad 7.

Returning to FIG. 3, the diaphragm actuator 60 comprises a closed-end cylinder 70 formed in the first caliper arm 12, a diaphragm 75 housed in the cylinder 70, a pressure chamber 63 defined between a bottom portion 72 of the cylinder 70 and the diaphragm 75, a plurality of pistons 55 interposed between the diaphragm 75 and the movable brake pad 7, and a guide frame 65 that supports the pistons 55 so that the pistons 55 slide in the X axis direction. During braking of the railway vehicle, the diaphragm 75 drives the plurality of pistons 55 in accordance with an air pressure introduced into the pressure chamber 63 such that the holder 8 is pressed in the X axis direction, and as a result, the movable brake pad 7 is pressed against the first frictional surface 6a. For this purpose, the holder 8 is formed in advance with a larger planar form than a region of the diaphragm 75 in which the pistons 55 are disposed.

The cylinder 70 comprises a cylinder inner wall 71 that has a substantially kidney-shaped cross-section and extends in the X axis direction, the bottom portion 72, which is formed integrally with the cylinder inner wall 71 on a plane defined by the Y axis and the Z axis and closes one end of the cylinder 70, and a ring-shaped attachment seat 73 formed on another end of the cylinder inner wall 71 to latch a peripheral edge portion 76 of the diaphragm 75.

Returning to FIG. 2, the lining 9 of the movable brake pad 7 takes an overall curved shape in a rotation direction of the vehicle wheel 5, and is divided into a plurality of segments relative to the rotation direction of the vehicle wheel 5, as shown by broken lines in the figure. Each segment is fixed to the body 7*a*.

When seen from the X axis direction, the cylinder inner wall 71 is constituted by curved wall portions 71*c* and 71*d* formed around an outer periphery of the lining 9 of the movable brake pad 7 so as to face the Z axis direction, or in other words the front-rear direction of the railway vehicle, and upper and lower arc-shaped wall portions 71*a* and 71*b* connected to the curved wall portions 71*c* and 71*d*. The arc of the curved wall portions 71*c* and 71*d* when seen from the X axis direction corresponds to a concentric circle centering on the axle of the vehicle wheel 5.

The cylinder 70 and the movable brake pad 7 are vertically symmetrical to a parallel center line Oz to the Z axis of the brake caliper 10. The adjustor attachment recess portions 12*a* and 12*b* are disposed in vertically symmetrical positions relative to the center line Oz. The arc-shaped wall portions 71*a* and 71*b* of the cylinder inner wall 71 form arcs that are oppositely oriented to the adjustor attachment recess portions 12*a* and 12*b*.

Returning to FIG. 3, the ring-shaped attachment seat 73 is formed on one end of the cylinder inner wall 71 on a plane defined by the Y axis and the Z axis. A peripheral edge portion of the guide frame 65 is fixed to the attachment seat 73 by a plurality of bolts 66. Further, the peripheral edge portion 76 of the diaphragm 75 is sandwiched between the peripheral edge portion of the guide frame 65 and the attachment seat 73.

The diaphragm 75 is constituted by the peripheral edge portion 76, a bellows portion 77 that expands from the peripheral edge portion 76 toward the bottom portion 72 along the cylinder inner wall 71 and then curves back substantially 180 degrees inward, and a piston pressing portion 79 that forms a parallel plane to the movable brake pad 7 on the inside of the bellows portion 77. The peripheral edge portion 76, bellows portion 77, and piston pressing portion 79 are formed integrally from rubber. The piston pressing portion 79 has a substantially kidney-shaped planar form which is slightly smaller than, but similar to, a transverse section of the cylinder 70 defined by the cylinder inner wall 71.

The guide frame 65 is disposed between the diaphragm 75 and the holder 8. Guide holes 65*a* are formed in the guide frame 65 in the X axis direction in an identical number to the pistons 55, and the pistons 55 are fitted into the respective guide holes 65*a* so as to be free to slide in the X axis direction.

Returning to FIG. 2, the guide holes 65*a* are formed at equal angular intervals in three concentric circles centering on the axle of the vehicle wheel 5. The guide holes 65*a* arranged in a central circle of the three concentric circles are disposed at equal intervals facing a central portion of the movable brake pad 7. The guide holes 65*a* arranged in an outside circle of the three concentric circles are disposed at equal intervals along the curved wall portion 71*c* so as to face an outer peripheral portion of the movable brake pad 7. The guide holes 65*a* arranged in an inside circle of the three concentric circles are disposed at equal intervals along the curved wall portion 71*d* so as to face an inner peripheral portion of the movable brake pad 7.

An outer diameter of each piston 55 is set at 22 millimeters (mm), for example. The pistons 55 are disposed at a substantially equal density over the entire region of the movable brake pad 7.

In FIG. 2, the pistons 55 are disposed in three columns, but the arrangement of the pistons 55 is not limited thereto. By varying the outer diameter and axial direction length of the pistons 55, a distribution of the pressing force applied to the movable brake pad 7 can be controlled.

Returning to FIG. 3, a disc-shaped adiabatic plate 61 formed from an adiabatic material is attached to a tip end of each piston 55. The adiabatic plate 61 prevents heat generated in the lining 9 from being transmitted to the diaphragm 75.

A back surface plate 62 is attached to a back surface of the piston pressing portion 79 of the diaphragm 75. The back surface plate 62 is fixed to the piston pressing portion 79 by a plurality of bolts 67. The back surface plate 62 is formed from a plate material having a substantially identical shape to the piston pressing portion 79. The bolts 67 are disposed at substantially equal intervals around the peripheral edge portion of the back surface plate 62.

Returning to FIG. 2, a through hole 69 for supplying compressed air to the pressure chamber 63 from an air pressure source installed in the railway vehicle is formed in the brake caliper 10. The through hole 69 is formed on the center line Oz of the brake caliper 10 by machine processing. The supply of compressed air into the pressure chamber 63 through the through hole 69 is controlled via a switching valve that operates in accordance with a command signal from a controller. When braking is not underway, the pressure chamber 63 is open to the atmosphere.

When braking is not underway in the caliper brake device 1 constituted in the manner described above, the movable brake pad 7 is separated from the first frictional surface 6*a* of the vehicle wheel 5 by an elastic force of the return springs 44 of the pair of adjustors 41. Furthermore, the pressure in the pressure chamber 63 is low, and therefore the diaphragm 75 contracts such that the pistons 55 are held in a withdrawn position.

During braking, the diaphragm 75 expands in accordance with the supply of compressed air to the pressure chamber 63, and therefore the return springs 44 of the adjustors 41 are deformed such that the movable brake pad 7 is pressed toward the first frictional surface 6*a* via the pistons 55, the adiabatic plate 61, and the holder 8. As a result, the lining 9 of the movable brake pad 7 contacts the first frictional surface 6*a* of the vehicle wheel 5 such that a brake is applied to the rotation of the vehicle wheel 5 by means of frictional force.

FIG. 5A shows a conventional hydraulic piston type caliper brake device. This conventional device performs braking by having a pair of pistons press the movable brake pad 7 against a rotor using working oil pressure introduced into an oil pressure chamber 48. In this conventional device, the dimensions of a cylinder 47 housing the pistons and a required oil pressure introduced into the oil pressure chamber 48 are set as follows. A hatched portion of the figure indicates a pressure receiving surface area of the piston.

Diameter of cylinder 47: $\phi$ 38 (mm)×2

Sectional area of cylinder 47 (pressure receiving surface area of piston): 2,268 square millimeters ($mm^2$)

Required oil pressure: 9 megapascals (MPa)

Pressing force=2268×9=approx. 20 kilonewtons (kN)

FIG. 5B shows the air pressure diaphragm type caliper brake device 1 according to this invention. Here, the sectional area of the cylinder 70 and the required air pressure introduced into the pressure chamber 63 are set as follows.

Sectional area of cylinder 70 (=pressure receiving surface area of diaphragm 75): 27,697 ($mm^2$)

Required air pressure: 0.75 (MPa)

Pressing force=27697×0.75=approx. 20 (kN)

The movable brake pad pressing force of the caliper brake device 1 according to this invention is approximately 20 kN, i.e. identical to that of the conventional hydraulic piston type caliper brake device.

Hence, a sufficiently large pressure receiving surface area can be secured on the diaphragm 75 within the limited space of the brake caliper 10, and therefore the diaphragm actuator 60 of the caliper brake device 1 can apply the required pressing force to the movable brake pad 7 using air pressure that is much lower than the required oil pressure.

The caliper brake device 1 according to this invention presses the movable brake pad 7 against the first frictional surface 6a via the plurality of pistons 55 by causing the diaphragm 75 to expand. Even when the brake caliper 10 bends or deformation occurs on a rotation surface of the first frictional surface 6a due to a reaction force to the pressing force, the movable brake pad 7 is pressed against the first frictional surface 6a with an even contact pressure. Therefore, a frictional coefficient of the movable brake pad 7 can be kept high at all times, and as a result, the original braking force of the movable brake pad 7 can be exhibited. Furthermore, since the contact pressure is even, local temperature increases are unlikely to occur in the movable brake pad 7 and the first frictional surface 6a, and therefore partial wear is unlikely to occur on the movable brake pad 7 and the first frictional surface 6a.

When the first caliper arm 12 of the brake caliper 10 bends in a separating direction from the first frictional surface 6a of the vehicle wheel 5 during braking, the movable brake pad 7 is held parallel to the first frictional surface 6a. Hence, partial wear of the lining 9 in a radial direction can be prevented.

In the caliper brake device 1, the pistons 55 and the guide frame 65 are interposed between the diaphragm 75 and the movable brake pad 7, and therefore heat generated by the movable brake pad 7 is prevented from being transmitted to the diaphragm 75 by these members. Hence, the diaphragm 75 is unlikely to suffer heat-related damage.

The diaphragm actuator 60 drives the movable brake pad 7 directly using air pressure supplied from the air pressure source installed in the railway vehicle, and therefore, there is no need to install a pneumatic-hydraulic converter, an oil pressure source, and hydraulic piping in the railway vehicle. Hence, by employing the caliper brake device 1 according to this invention, a reduction in the weight of the railway vehicle can be achieved.

Instead of supplying air pressure to the pressure chamber 63 of the caliper brake device 1, oil pressure may be supplied. In this case also, a large number of pistons are used in comparison with a conventional hydraulic piston type caliper brake device, and therefore the movable brake pad 7 can be pressed evenly. Moreover, by employing a large number of pistons, the pressure receiving surface area increases, and as a result, the required pressing force can be secured at a low oil pressure. Hence, the size of the pneumatic-hydraulic converter can be reduced.

The brake caliper 10 is supported in a floating state via the upper slide pin 30 and the lower slide pin 32 so as to be capable of displacing in the X axis direction relative to the support frame 20, and therefore, by driving the diaphragm actuator 60 provided in the first caliper arm 12, of the first caliper arm 12 and second caliper arm 14 which extend so as to straddle the two frictional surfaces 6a and 6b, the movable brake pad 7 can be pressed against the opposing first frictional surface 6a and the fixed brake pad 700 can be pressed against the second frictional surface 6b with equal force. Hence, the number of constitutional components of the diaphragm actuator 60 can be reduced, enabling a reduction in the size of the caliper brake device 1.

In the caliper brake device 1, the movable brake pad 7 is supported by the brake caliper 10 via the pair of anchor pins 43, and the pressure chamber 63 is formed between the anchor pins 43. Therefore, when the anchor pins 43 expand and contract in accordance with expansion of the diaphragm 75, the movable brake pad 7 can advance toward and retreat from the first frictional surface 6a smoothly. Furthermore, the pressure receiving surface area of the diaphragm 75 can be secured sufficiently in a space located between the anchor pins 43, and therefore the required pressing force can be applied over a wide range of the movable brake pad 7. Moreover, the diaphragm 75 and the guide frame 65 are disposed so as to overlap in the X axis direction, and therefore these members can all be disposed within the limited space of the brake caliper 10. Hence, an increase in the size of the brake caliper 10 can be avoided.

The lining 9 of the movable brake pad 7 takes a curved shape corresponding to the first frictional surface 6a, and the cylinder inner wall 71 is constituted by the front and rear curved wall portions 71c, 71d shaped in alignment with the lining 9 and the upper and lower arc-shaped wall portions 71a, 71b linking the front and rear curved wall portions 71c, 71d. Therefore, the pressure receiving surface area of the diaphragm 75 can be secured sufficiently within the limited space of the brake caliper 10. Moreover, bending of the peripheral edge portion 76 of the diaphragm 75 can be avoided, and therefore favorable durability can be obtained in the diaphragm 75.

In the caliper brake device 1, the holder 8, the adiabatic plate 61, and the pistons 55 are interposed between the movable brake pad 7 and the piston pressing portion 79 of the diaphragm 75, and therefore heat transmission from the movable brake pad 7 to the diaphragm 75 can be blocked reliably. Hence, the rubber diaphragm 75 can be prevented from suffering heat-related damage.

Figure 6:
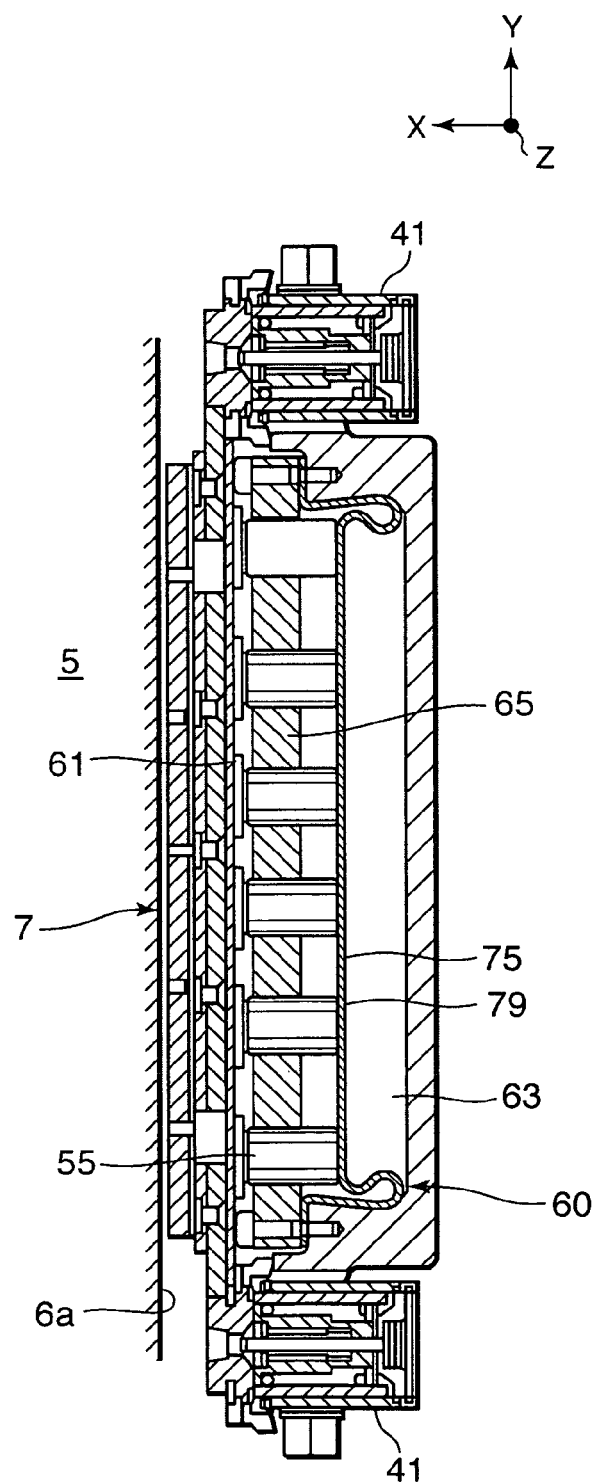
FIG. 6 is similar to FIG. 3, but shows a variation relating to the structure of a diaphragm.

In the caliper brake device 1, the back surface plate 62 is fixed to the piston pressing portion 79, and therefore the rigidity of a contact portion between the piston pressing portion 79 and the adiabatic plate 61 is improved, leading to an improvement in the strength of the piston pressing portion 79. However, the back surface plate 62 may be omitted, as shown in FIG. 6.

Figure 7:
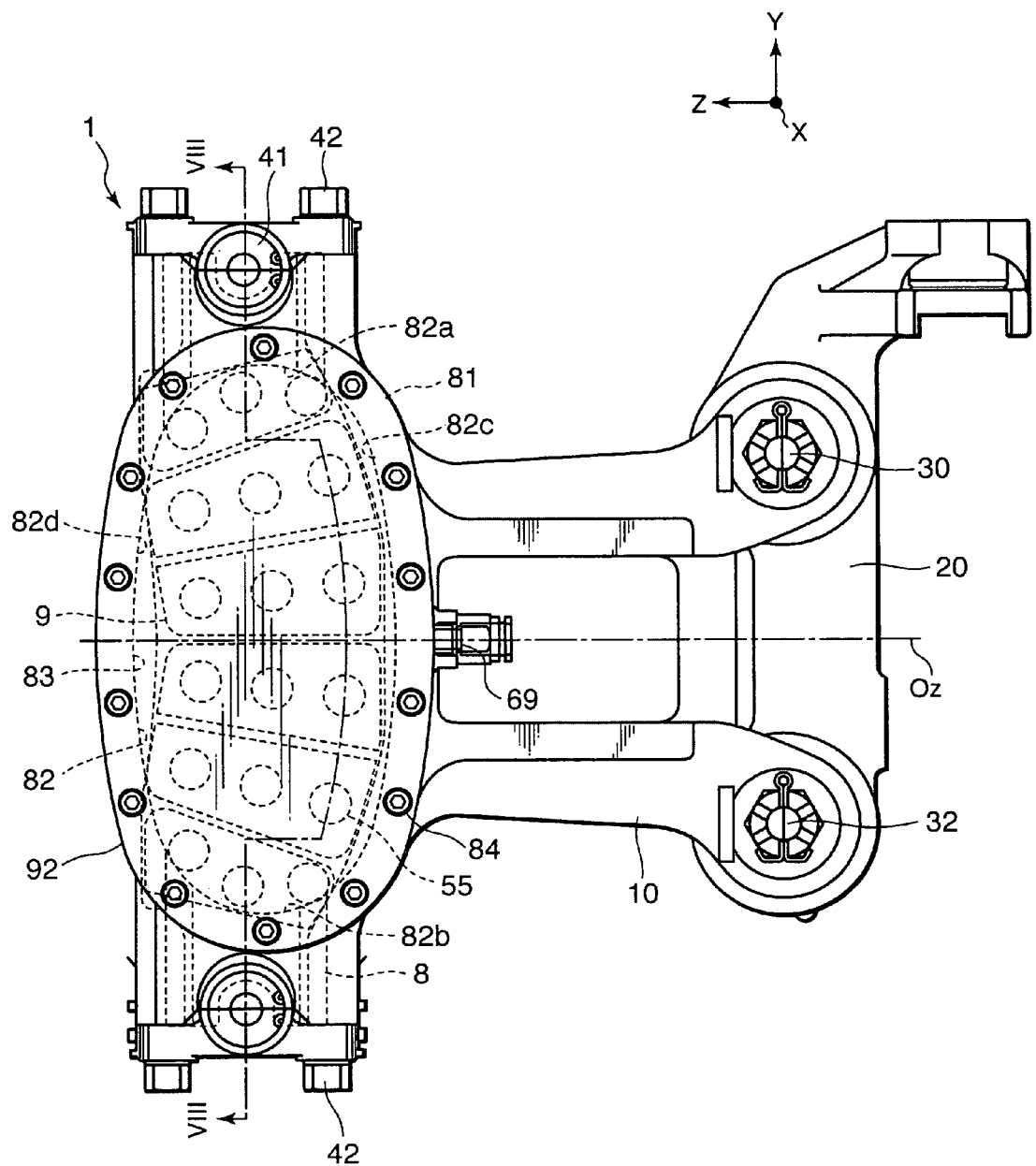
FIG. 7 is a side view of a caliper brake device according to a second embodiment of this invention.
Figure 8:
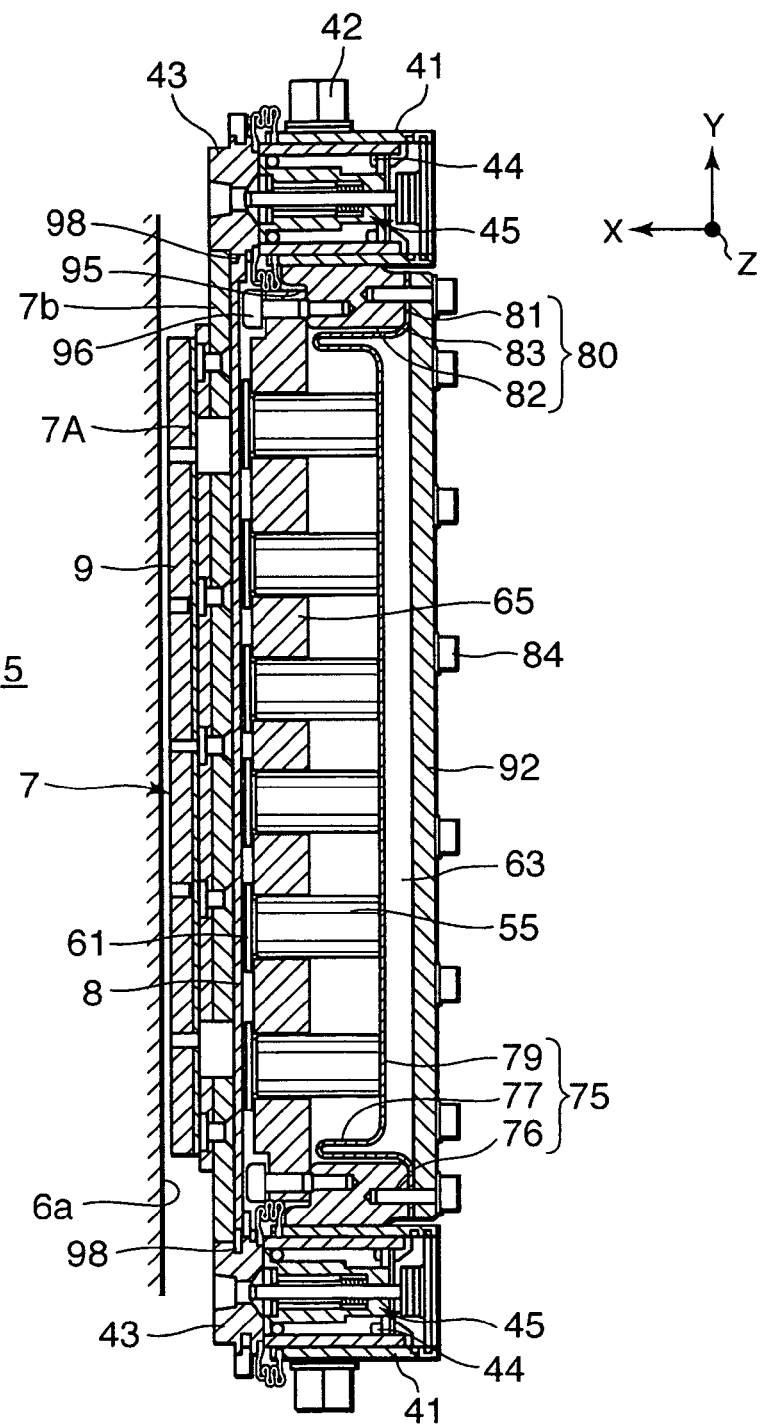
FIG. 8 is a longitudinal sectional view of the caliper brake device according to the second embodiment of this invention, taken along a VIII-VIII line in FIG. 7.

Referring to FIGS. 7 and 8, a second embodiment of this invention will be described.

Referring to FIG. 8, the caliper brake device 1 according to this embodiment comprises a cylinder 80 formed in the first caliper arm 12 with two open ends, which takes the place of the cylinder 70 according to the first embodiment, and a cover 92 that closes one end of the cylinder 80 to form a bottom portion. The diaphragm 75 is housed in the cylinder 80.

The cylinder 80 comprises a cylinder inner wall 82 that has a substantially elliptical cross-section and extends in the X axis direction, and a ring-shaped attachment seat 81 that is formed on a plane defined by the Y axis and the Z axis to latch the peripheral edge portion 76 of the diaphragm 75.

Referring to FIG. 7, the cylinder 80, the movable brake pad 7, the cover 92, and the attachment seat 81 are formed to be vertically symmetrical about the center line Oz of the brake caliper 10, which is parallel to the Z axis.

A plurality of bolt holes are formed in the attachment seat 81 at predetermined intervals, and the cover 92 is fixed to the attachment seat 81 via bolts 84 screwed into the bolt holes.

The cylinder inner wall 82 is constituted by front and rear curved wall portions 82c and 82d that curve around the lining 9 of the movable brake pad 7, and upper and lower arc-shaped wall portions 82a and 82b that connect the front and rear curved wall portions 82c and 82d.

Returning to FIG. 8, the peripheral edge portion 76 of the diaphragm 75 is sandwiched between the attachment seat 81 and the cover 92.

A chamfered portion 83 is formed between the attachment seat 81 and the cylinder inner wall 82 of the cylinder 80. The chamfered portion 83 serves to ensure that the diaphragm 75 curves gently, rather than sharply, from the peripheral edge portion 76 to the bellows portion 77.

The bellows portion 77 curves by substantially 90 degrees around the chamfered portion 83 from the peripheral edge portion 76, expands in the direction of the guide frame 65 along the cylinder inner wall 82, and then curves substantially 180 degrees inward to reach the piston pressing portion 79. By forming the diaphragm 75 in this manner, the cylinder inner wall 82 is positioned on the outside of the pressure chamber 63, in contrast to the cylinder inner wall 71 of the first embodiment.

A ring-shaped attachment seat 95 opposing the vehicle wheel 5 is formed on an opposite end portion of the cylinder 80 to the cover 92. The guide frame 65 is fixed to the attachment seat 95 by a plurality of bolts 96.

All other constitutions are identical to the first embodiment.

Similar favorable effects to those of the first embodiment are obtained in this embodiment.

Figure 9:
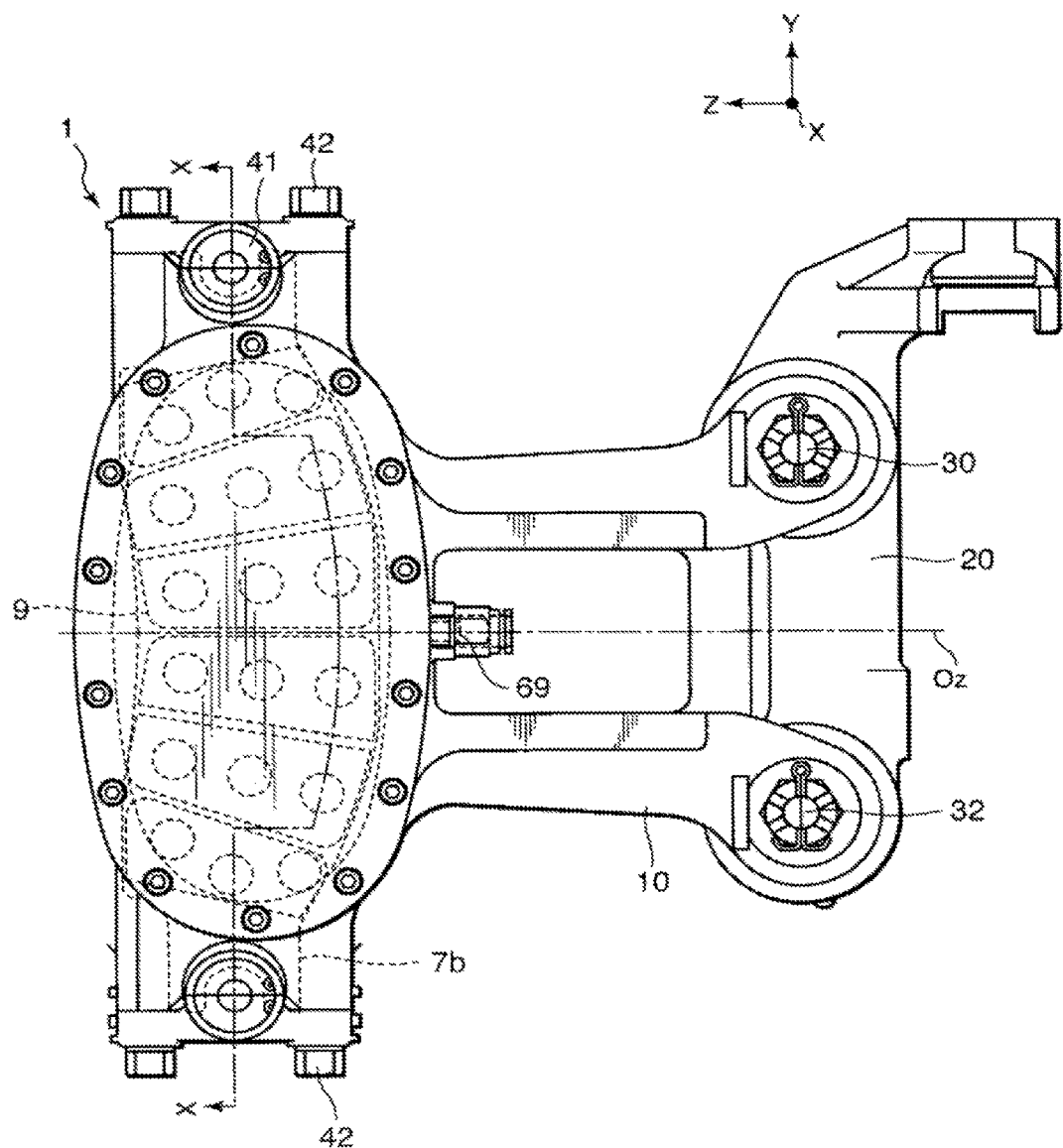
FIG. 9 is a side view of a caliper brake device according to a third embodiment of this invention.
Figure 10:
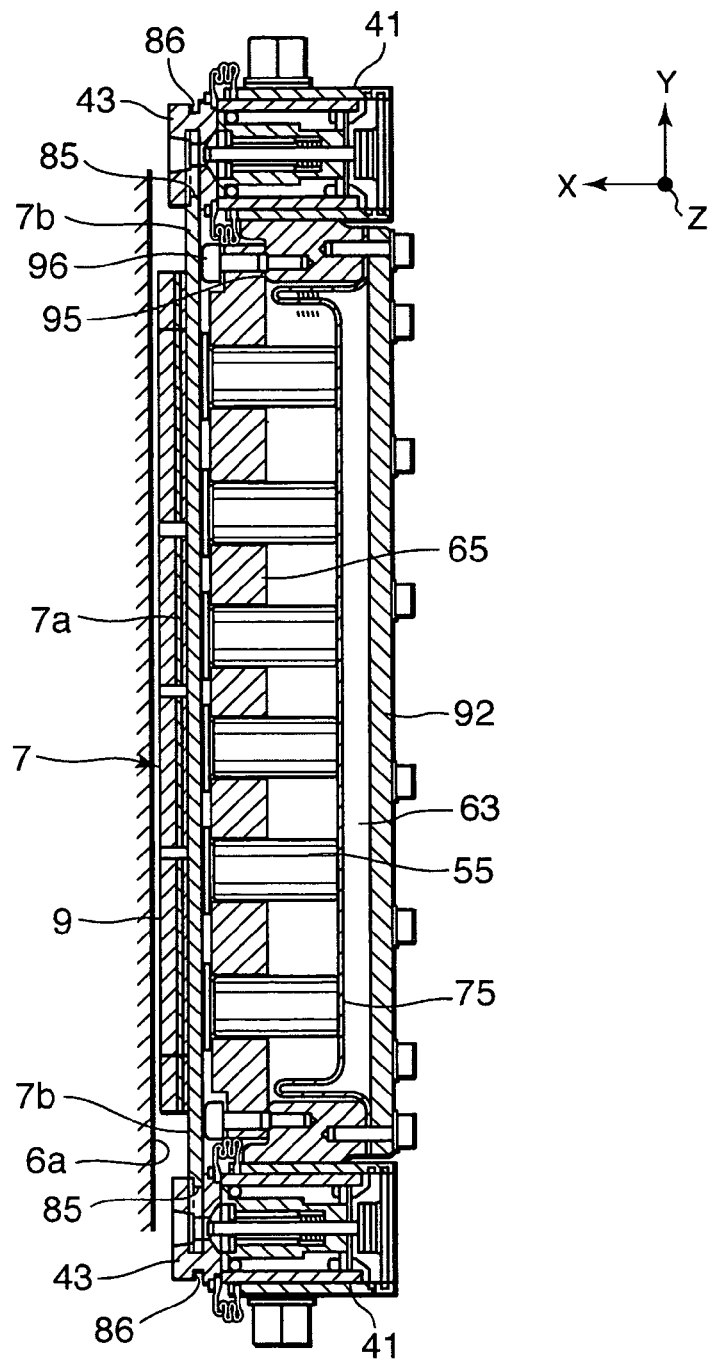
FIG. 10 is a longitudinal sectional view of the caliper brake device according to the third embodiment of this invention, taken along a X-X line in FIG. 9.

Referring to FIGS. 9 and 10, a third embodiment of this invention will be described.

This embodiment is similar to the second embodiment, but the holder 8 is omitted and the movable brake pad 7 is supported by the respective anchor pins 43 directly.

The movable brake pad 7 is constituted by the lining 9, which is configured to contact the first frictional surface 6a, which is rotating, the body 7a to which the lining 9 is fixed, and the engaging portion 7b formed on the rear surface of the body 7a.

A ring-shaped engaging groove 86 is formed in the outer periphery of each anchor pin 43. Edges 85 that engage with the engaging grooves 86 in the upper and lower anchor pins 43 are formed respectively on the upper end and the lower end of the engaging portion 7b.

By engaging the edges 85 with the engaging grooves 86 in the upper and lower anchor pins 43, the movable brake pad 7 is latched to the first caliper arm 12. The anchor pins 43 are supported by the adjustors 41 to be capable of advancing and retreating relative to the first frictional surface 6a. The movable brake pad 7 approaches the first frictional surface 6a or separates from the first frictional surface 6a in accordance with the expansion/contraction operation of the diaphragm 75.

Similar favorable effects to those of the second embodiment are obtained in this embodiment.

Furthermore, in this embodiment, the edges 85 on the upper end and lower end of the engaging portion 7b of the movable brake pad 7 are supported directly by the anchor pins 43 such that during braking, the diaphragm 75 presses the movable brake pad 7 directly via the pistons 55. Therefore, the holder 8 can be omitted, enabling simplification of the structure of the caliper brake device 1 and a reduction in the X axis direction dimension of the brake caliper 10.

Although the invention has been described above with reference to certain embodiments, the invention is not limited to the embodiments described above. Modifications and variations of the embodiments described above will occur to those skilled in the art, within the scope of the claims.

For example, in the above embodiments, the frictional surfaces 6a and 6b formed on either side of the vehicle wheel 5 are sandwiched between the brake pads 7 and 700. However, this invention may be applied to a caliper brake device in which the frictional surfaces 6a and 6b are formed on the respective surfaces of a rotor that rotates integrally with the vehicle wheel 5 such that the frictional surfaces 6a and 6b are sandwiched between the brake pads 7 and 700.

Industrial Applicability

As described above, with the caliper brake device according to this invention, a pressing force for pressing a brake pad against a rotary body can be made even. Hence, when the caliper brake device according to this invention is applied to a vehicle wheel braking device for a railway vehicle, in which a large brake pad pressing force is required, a particularly favorable effect is obtained.

The embodiments of this invention in which an exclusive property or privilege is claimed are defined as follows:

What is claimed is:

1. A caliper brake device for a vehicle, which applies a brake to rotation of a rotary body by sandwiching a first frictional surface and a second frictional surface formed on either side of the rotary body, comprising:
   a brake caliper having a first caliper arm that faces the first frictional surface and a second caliper arm that faces the second frictional surface;
   a movable brake pad that is supported by the first caliper arm and applies a braking force to the first frictional surface by displacing toward the first frictional surface;
   a pressure chamber formed in the brake caliper;
   a diaphragm that expands in accordance with a pressure of the pressure chamber;
   a plurality of pistons that drive the movable brake pad in a rotary axis direction of the rotary body in accordance with the expansion of the diaphragm;
   a guide member that guides a displacement of the plurality of pistons in a right-angle direction relative to the first frictional surface;
   a support mechanism that supports the brake caliper to be capable of displacing in the rotary axis direction of the rotary body; and
   a fixed brake pad that is fixed to the second caliper arm and applies a braking force to the second frictional surface in cooperation with the movable brake pad when pressure is supplied to the pressure chamber.

2. The caliper brake device as defined in claim 1, further comprising a pair of anchor pins that support the movable brake pad to be capable of displacing in said right-angle direction, wherein the pressure chamber is formed between the pair of anchor pins.

3. The caliper brake device as defined in claim 2, further comprising a holder that latches the movable brake pad to the pair of anchor pins.

4. The caliper brake device as defined in claim 2, wherein the movable brake pad comprises a pair of edges that are latched directly to the pair of anchor pins.

5. The caliper brake device as defined in claim 2, further comprising:
   springs that bias the anchor pins in a direction of separation from the first frictional surface; and
   gap adjustment mechanisms that keep distances between the anchor pins and the first frictional surface constant when an external force other than spring forces of the springs does not act on the movable brake pad.

6. The caliper brake device as defined in claim 1, wherein the diaphragm comprises a piston pressing portion that displaces the movable brake pad via the plurality of pistons and a bellows portion formed on a periphery of the piston pressing portion to allow the piston pressing portion to displace in the rotary axis direction of the rotary body,
   the first caliper arm comprises a cylinder which accommodates the diaphragm and includes a bottom portion, the cylinder including a cylinder inner wall surrounding the bellows portion, the cylinder further including a ring-shaped attachment seat, the pressure chamber is formed between the bottom portion of the cylinder and the diaphragm, the guide member is constituted by a guide frame into which the plurality of pistons are inserted to be free to slide, and the ring-shaped attachment seat has a peripheral edge portion of the guide frame fixed thereto.

7. The caliper brake device as defined in claim 6, wherein the diaphragm comprises a peripheral edge portion that is sandwiched between the peripheral edge portion of the guide frame and the attachment seat.

8. The caliper brake device as defined in claim 6, wherein the movable brake pad comprises a lining having a shape that curves in a rotation direction of the first frictional surface, and the cylinder has a transverse section that curves in alignment with the shape of the lining.

9. The caliper brake device as defined in claim 6, further comprising a back surface plate fixed to a rear surface of the piston pressing portion.

10. The caliper brake device as defined in claim 1, further comprising a bottom portion, wherein the diaphragm comprises a piston pressing portion that displaces the movable brake pad via the plurality of pistons and a bellows portion formed on a periphery of the piston pressing portion to allow the piston pressing portion to displace in the rotary axis direction of the rotary body, the first caliper arm comprises a cylinder which accommodates the diaphragm, the cylinder including a cylinder inner wall surrounding the bellows portion, the cylinder further including a ring-shaped attachment seat and a diaphragm attachment seat formed on one end of the cylinder, the bottom portion is constituted by a cover fixed to an end of the cylinder, the diaphragm comprises a peripheral edge portion sandwiched between the diaphragm attachment seat formed on one end of the cylinder and the cover, the pressure chamber is formed between the bottom portion and the diaphragm, the guide member is constituted by a guide frame into which the plurality of pistons are inserted to be free to slide, and the ring-shaped attachment seat has a peripheral edge portion of the guide frame fixed thereto.

11. The caliper brake device as defined in claim 10, wherein the movable brake pad comprises a lining having a shape that curves in a rotation direction of the first frictional surface, and the cylinder has a substantially elliptical transverse section that covers the lining.

12. The caliper brake device as defined in claim 10, wherein the cylinder further comprises a chamfered portion provided between the diaphragm attachment seat and the cylinder inner wall.

13. The caliper brake device as defined in claim 1, further comprising adiabatic plates interposed between the pistons and the movable brake pad.

* * * * *